No. 687,311. Patented Nov. 26, 1901.
E. W. HUGHES.
NUT HOLDER FOR BOLTS.
(Application filed Dec. 10, 1900.)
(No Model.) 2 Sheets—Sheet 1.

Witnesses.
Wm Munn Andrew
Robt Hunter

Inventor:
Ebenezer William Hughes
by Benj. I. King, Attorney.

No. 687,311. Patented Nov. 26, 1901.
E. W. HUGHES.
NUT HOLDER FOR BOLTS.
(Application filed Dec. 10, 1900.)
(No Model.) 2 Sheets—Sheet 2.
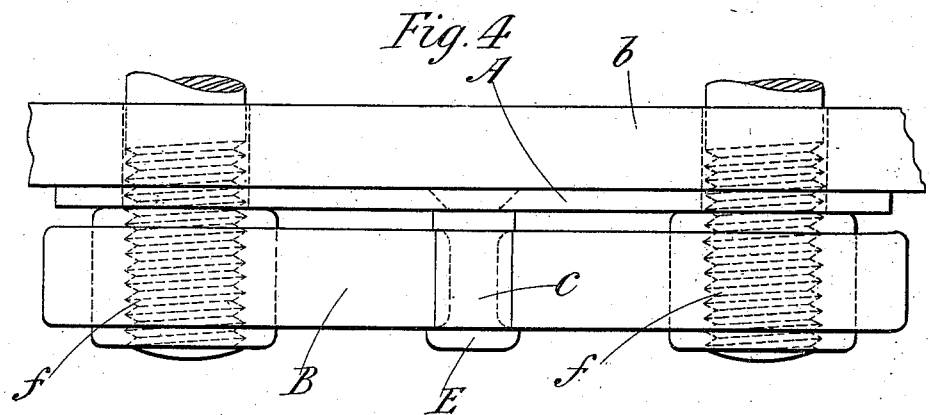
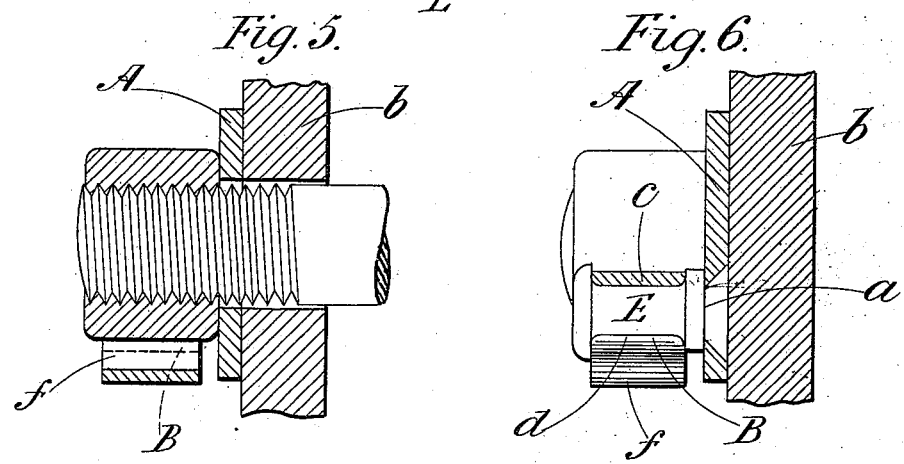
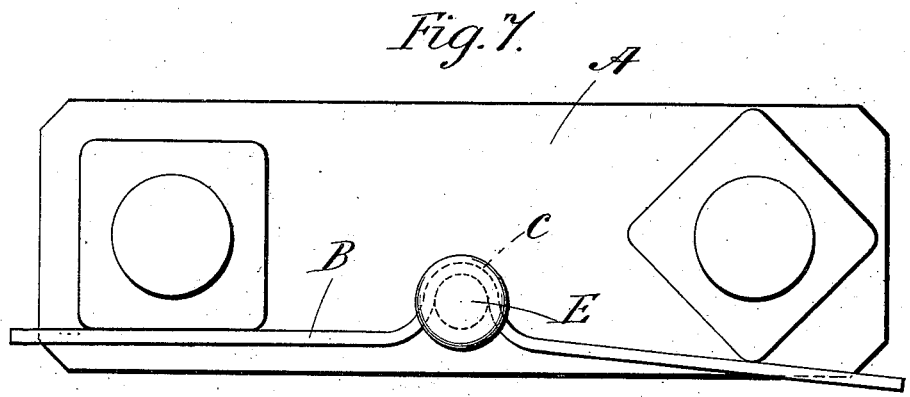
Witnesses
Inventor
Ebenezer William Hughes

UNITED STATES PATENT OFFICE.

EBENEZER WILLIAM HUGHES, OF LONDON, ENGLAND, ASSIGNOR TO EDWARD WILLIAMS, OF WEST DULWICH, ENGLAND.

NUT-HOLDER FOR BOLTS.

SPECIFICATION forming part of Letters Patent No. 687,311, dated November 26, 1901.

Original application filed October 8, 1900, Serial No. 32,464. Divided and this application filed December 10, 1900. Serial No. 39,349. (No model.)

*To all whom it may concern:*

Be it known that I, EBENEZER WILLIAM HUGHES, a subject of Her Majesty the Queen of Great Britain, residing at Camberwell, London, England, have invented a certain new and useful Improvement in Nut-Holders for Bolts, of which the following is a specification.

My invention relates to an improvement in nut-holders for bolts, it being principally adapted for use with the fish-plates of rail-joints and for like purposes, my present application being a divisional one on that filed by me in the United States Patent Office on the 8th of October, 1900, under Serial No. 32,464. In that application is described a nut-holder consisting of a plate or link having openings adapted to pass over two or more bolts and a spring plate or plates bent up from such plate or link at right angles and having indentations which engage with a corner of each nut in one position of same and a flat surface which engages one of the flat faces in another position and in a modification a separate similar spring-plate, but similarly rigidly attached to such plate. According to my present invention I form such spring-plate separately from the plate and provide the latter with means whereby not only may it be removably attached thereto, but by which it will also be so held as to be capable of adjusting itself more readily to the position the free ends of same may be required to occupy, the construction also enabling the nuts to be put on and screwed up before the spring is put in place, thus saving time in securing the nuts.

The invention is illustrated in the accompanying drawings, in which—

Figure 1:
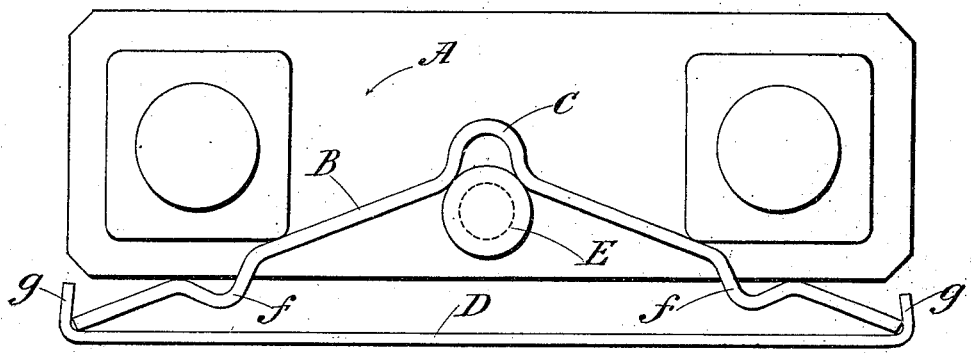
Figure 2:
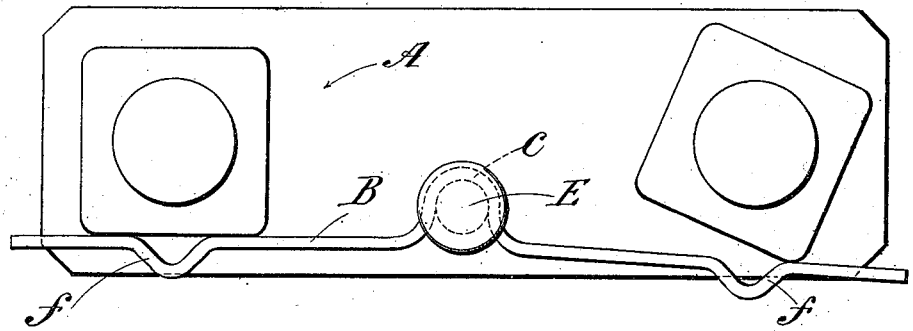
Figure 3:
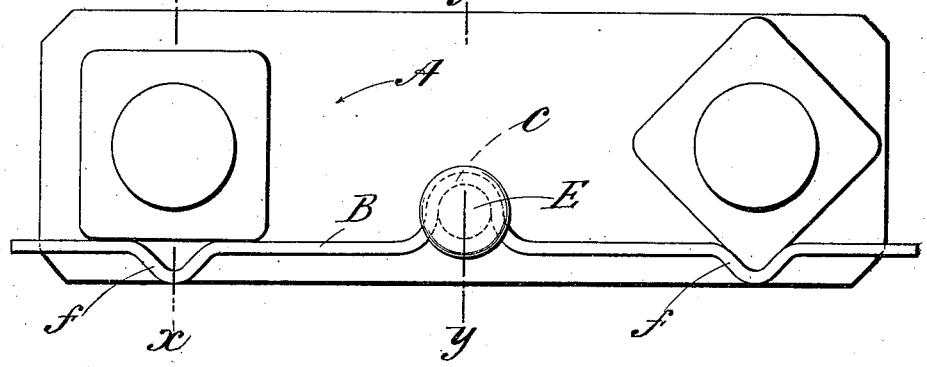

Figure 1 is an elevation of the plate held by two bolts, showing the spring-plate being placed in position by a holding device. Fig. 2 is a similar view showing the spring-plate in position with one of the nuts expanding same as in the act of turning. Fig. 3 is a similar view with the nuts in position, one being held on one of its flat faces and the other by one of its angles. Fig. 4 is a plan of Fig. 3. Fig. 5 is a section of Fig. 3 on line $x\ x$, and Fig. 6 is a similar section on line $y\ y$ looking to the left. Fig. 7 is a similar view to Fig. 2, but showing a plain spring-plate.

The plate A is provided with holes which embrace two or more bolts, two being shown in the present instance, and about midway of the plate I attach a stud E, which projects outwardly from the face of the plate and is riveted thereto by countersinking, as at $a$, Fig. 6, so that such plate may lie closely against the rail $b$ or part to which the bolts are applied.

The spring-plate B is formed of flexible tempered steel about the length of the plate A, with an upward loop $c$ near the middle of its length adapted to rest in a reduced portion $d$, Fig. 6, of the stud E, the ends of the spring lying normally in such a position that when the loop $c$ lies over the stud they will exert a considerable pressure upon the nuts. Each end of the spring-plate has an indentation $f$ formed therein adapted to receive the angles of the nuts, as described in the specification of the application before referred to, the action of the device being the same as that described in such former specification, except that the nuts are first preferably tightened up and the spring-plate then placed over the stud $c$ and sprung into position. To permit this to be readily done, I may employ a strip of metal D, Fig. 1, but of shorter length than the spring, having the ends $g\ g$ turned up to hold the ends of the spring, which is placed, as shown in Fig. 1, so that the loop of the spring can be readily put over the stud, after which the holder D can be knocked away, when the loop will fall or be pressed downward into the recess $d$ of the stud and the ends of the spring will rise against the under surface of the nuts and keep them in position, the holding being effected by the flat faces or by the angles, according to the position in which the nuts are set. If the nuts happen to require further adjustment, the spanner can be used without removing the spring, as the ends of the latter will yield downwardly to the angles of the nut, which latter will also pass through the indentations $f$ by reason of the shape of the latter. If desired, however, the ends of the spring can be first held down to allow the nuts to be turned. It will be seen that as the spring is deflected by the rotation of the nut or by the holding down of same, as described, the looped portion will be caused to close somewhat on the stud, so as to tighten the grip on same, the construction preventing the spring from moving laterally and becoming displaced, though it allows it to adjust itself freely in other ways.

In Fig. 7 I show a plain spring-plate B, as it will be evident that if the nut is to be locked in any one of four positions only such a spring-plate is sufficient; but where more positions are required the indentations are desirable.

What I claim is—

1. In a nut-holder for bolts, and in combination, a plate adapted to embrace more than one bolt, a stud carried by such plate, a loose spring-plate adapted to bear on the flat faces of the nuts, means carried by the same adapted to engage the angles of the nuts and a looped portion approximately midway in the same, and adapted to partly embrace the stud and to tighten its grip on the same when the spring is deflected, the stud being so positioned on the plate that when the spring-plate is held by the same the free ends bear on the faces or corners of the nuts with a spring-pressure so that the latter are held by their flat faces or their angles substantially as described.

2. In a device of the character described, a plate adapted to be retained by the nuts to be locked, a stud projecting from the plate, and a resilient strip bent approximately at its middle portion to form a deep loop embracing the stud and having angular depressions near its ends to engage the corners of the nuts on the side of the strip opposite the stud, whereby the nuts in turning force the ends of the strip in a direction to cause the loop to more closely embrace the stud.

3. In a device of the character described, a plate adapted to be retained by the nuts to be locked, a headed stud projecting from said plate, a resilient strip bent to form a loop embracing the stud and having at its ends, on the side opposite the stud, flat bearing-surfaces adapted to engage the sides of the nuts, said flat bearing-surfaces being interrupted by angular depressions to engage the corners of the nuts, substantially as described.

In testimony that I claim the foregoing as my invention I have signed my name in presence of two subscribing witnesses.

EBENEZER WILLIAM HUGHES.

Witnesses:
BENJN. THOMAS KING,
HERBERT ARTHUR MARSHALL.